US009830530B2

(12) United States Patent
Chiaki et al.

(10) Patent No.: US 9,830,530 B2
(45) Date of Patent: *Nov. 28, 2017

(54) HIGH SPEED SEARCHING METHOD FOR LARGE-SCALE IMAGE DATABASES

(71) Applicant: International Business Machines Corporation, Armonk, NY (US)

(72) Inventors: Oishi Chiaki, Tokyo (JP); Hiroki Nakano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/865,837

(22) Filed: Sep. 25, 2015

(65) Prior Publication Data

US 2016/0034776 A1 Feb. 4, 2016

Related U.S. Application Data

(63) Continuation of application No. 14/806,038, filed on Jul. 22, 2015.

(30) Foreign Application Priority Data

Jul. 31, 2014 (JP) ................................. 2014-156933

(51) Int. Cl.
*G06K 9/46* (2006.01)
*G06K 9/00* (2006.01)
(Continued)

(52) U.S. Cl.
CPC ......... *G06K 9/481* (2013.01); *G06K 9/00536* (2013.01); *G06K 9/4671* (2013.01);
(Continued)

(58) Field of Classification Search
CPC ............. G06K 9/4671; G06K 9/00536; G06K 9/6211; G06K 9/6256; G06K 9/66; G06K 9/481; G06K 9/46; G06F 17/30247
(Continued)

(56) References Cited

U.S. PATENT DOCUMENTS

| 6,711,293 | B1 | 3/2004 | Lowe | |
|---|---|---|---|---|
| 2012/0127276 | A1* | 5/2012 | Tsai | ..................... G06K 9/4671 |
| | | | | 348/47 |

(Continued)

FOREIGN PATENT DOCUMENTS

| IT | WO 2013102488 A1 * | 7/2013 | ........... G06K 9/6211 |
|---|---|---|---|
| JP | 09245166 | 9/1997 | |

(Continued)

OTHER PUBLICATIONS

Lowe. "Object Recognition from Local Scale-Invariant Features." Proceedings of the Seventh IEEE International Conference on Computer Vision, Sep. 20, 1999, 8 pages.*

(Continued)

*Primary Examiner* — Jon Chang
(74) *Attorney, Agent, or Firm* — Lieberman & Brandsdorfer, LLC

(57) ABSTRACT

Embodiments are provided to search for a dictionary image corresponding to a target image. The method includes detecting keypoints in a set of dictionary images. The set of dictionary images includes at least one dictionary image having a plurality of pixels. At least one random pair of pixels is selected among the detected keypoints of the dictionary image on the basis of candidate coordinates for pixels distributed around the detected keypoints of the dictionary image. A feature vector of each keypoint of the dictionary image is calculated, including calculating a difference in brightness between the selected pairs of pixels of (Continued)

128 coordinate pairs selected randomly from among candidate coordinates in the Gaussian distribution, and the sequence of the brightness difference among the pairs is rendered as a 128 dimensional feature vector the dictionary image. The calculated difference in brightness is an element of the feature vector. Keypoints of a target image are detected.

10 Claims, 10 Drawing Sheets

(51) Int. Cl.
*G06K 9/62* (2006.01)
*G06K 9/66* (2006.01)
*G06K 9/48* (2006.01)

(52) U.S. Cl.
CPC .......... *G06K 9/6211* (2013.01); *G06K 9/6256* (2013.01); *G06K 9/66* (2013.01)

(58) Field of Classification Search
USPC ................................. 382/103, 190, 201, 305
See application file for complete search history.

(56) References Cited

U.S. PATENT DOCUMENTS

| | | | |
|---|---|---|---|
| 2015/0016712 A1* | 1/2015 | Rhoads | G06K 9/00208 382/154 |
| 2015/0036936 A1* | 2/2015 | Balestri | G06K 9/6255 382/201 |

FOREIGN PATENT DOCUMENTS

| | | |
|---|---|---|
| JP | 2000216979 | 8/2000 |
| JP | 2003242509 | 8/2003 |
| JP | 2005122351 | 5/2005 |
| JP | 2006252162 | 9/2006 |
| JP | 2009163682 | 7/2009 |
| JP | 2010218051 | 9/2010 |
| JP | 2011248879 | 12/2011 |
| JP | 2013101423 | 5/2013 |

OTHER PUBLICATIONS

Gonzalez et al. "Digital Image Processing." Addison-Wesley Publishing Company, 1977, pp. 154-161.*

Lowe, David G., Distinctive Image Features From Scale-Invariant Keypoints, International Journal of Computer Vision 60(2), pp. 91-110, 2004.

Muja et al., Fast Approximate Nearest Neighbors With Automatic Algorithm Configuration, VISAPP'09, No. 1, pp. 331-340, 2009.

Rublee et al., ORB: An Efficient Alternative to SIFT or SURF, ICCV 2011, pp. 2564-2571.

List of IBM Patents or Applications Treated as Related, Aug. 2015.

* cited by examiner

K-D Tree (a) Original Image (b) Keypoints 128 coordinate pairs selected randomly from among candidate coordinates in the Gaussian distribution, and the sequence of the brightness difference among the pairs is rendered as a 128 dimensional feature vector Keypoint in Dictionary Image (◯)

Matched Keypoint (◯) and Its Virtual
Center Point (●) in Searched Image

Search Target Images
(1280 x 720 Pixels)

Processing Time Required For Training SIFT Algorithm

Processing Time Required For Sequential Searching By SIFT Algorithm

Processing Time Required For Dictionary Image Training Using SIFT
(Including K-D Tree Creation)

Processing Time Required For High-Speed Searching
of Dictionary Images Using SIFT Processing Time Required For Training GIFT Algorithm
(Including K-D Tree Creation)

Processing Time Required For High-Speed Searching
By GIFT Algorithm

HIGH SPEED SEARCHING METHOD FOR LARGE-SCALE IMAGE DATABASES

CROSS-REFERENCE TO RELATED APPLICATION(S)

This application is a continuation patent application claiming the benefit of the filing date of U.S. patent application Ser. No. 14/806,038 filed on Jul. 22, 2015 and titled "High-Speed Searching Method for Large-Scale Image Databases" now pending, which is hereby incorporated by referenced, and which claims priority under 35 U.S.C. §119 from Japan Patent Application No. 2014-156933 titled "High-Speed Searching Method for Large-Scale Image Databases" filed Jul. 31, 2014, the entire contents of which are incorporated herein by reference.

BACKGROUND

The embodiments relate to a high-speed searching method for large-scale image databases. More specifically, the embodiments relate to a technique for searching large-scale image databases for search objects at high speeds.

As smartphones and tablets have increased in popularity, there is growing demand for activities such as internet shopping in which information related to an object is instantly retrieved by simply holding the device with a camera in front of the object. For example, when a user comes across an interesting book displayed on a poster or subway advertisement, the user can hold the device up to the advertisement, and the device can search for information on the book and purchase the book over the internet. There is usually a difference in an object included in a dictionary image set stored in an image database and an image of a target search object taken by a device, even an object on a page in a book. This is due to conditions such as size, shooting angle, and lighting. Practical search accuracy cannot be achieved simply by matching image bit maps.

One technology used to match objects with a high identification rate, even when there are differences due to conditions such as size, shooting angle, and lighting, is an object recognition technique using rotation- and scale invariant local image features called keypoints. In the technique known as Scale-invariant feature transform (SIFT), differences in the output from filters with adjacent scales are extracted, and image sets known as "Difference of Gaussians" (DoG) are obtained. Coordinates at which the absolute values in a DoG image are at their maximum in both the spatial direction and scale direction are called keypoints. A plurality of keypoints is usually detected in an image with gray scale patterns. The orientation of the keypoints is determined from the density gradient of the pixels surrounding the keypoints, and the maximum scale of the DoG is used as the keypoint scale. The pixels surrounding keypoints are divided into 16 blocks, and a gray scale histogram of the pixels in each block is extracted for use as a feature value of the keypoints. In SIFT, feature values are expressed as 128-dimensional vectors including real number elements. SIFT has an established reputation as a robust object recognition technique with respect to rotation and scaling variance. However, because of the large quantity of calculations, a brute-force method is used to match the keypoints in the large-scale image database with keypoints in the target search image. As a result of the enormous number of calculations required, practical search times are difficult to achieve.

It is an object of the embodiments described herein to provide a technique for searching large-scale image databases to search for objects at high speeds, and to overcome the problems associated with the prior art by using feature values to achieve reduced search times.

SUMMARY

The aspects described herein comprise a method for pattern matching using Gaussian distributed scale Invariant Feature Transform (GIFT) feature values (i.e., feature vectors).

According to one aspect, a method is provided detect keypoints in an image composed of a plurality of pixels. Random pairs of pixels among the detected keypoints are selected. The selection is based on candidate coordinates for pixels distributed around the detected keypoints. A brightness difference between the selected pair of pixels is calculated and converted into a feature vector.

The following description, the appended claims, and the embodiments further illustrate the features and advantages.

BRIEF DESCRIPTION OF THE DRAWINGS

In order for the advantages of the embodiments to be readily understood, a more particular description of the embodiments briefly described above will be rendered by reference to specific embodiments that are illustrated in the appended drawings. Understanding that these drawings depict only typical embodiments and are not therefore to be considered to be limiting of its scope, the embodiments will be described and explained with additional specificity and detail through the use of the accompanying drawings.

DETAILED DESCRIPTION OF THE EMBODIMENTS

It will be readily understood that the components of the embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the invention, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
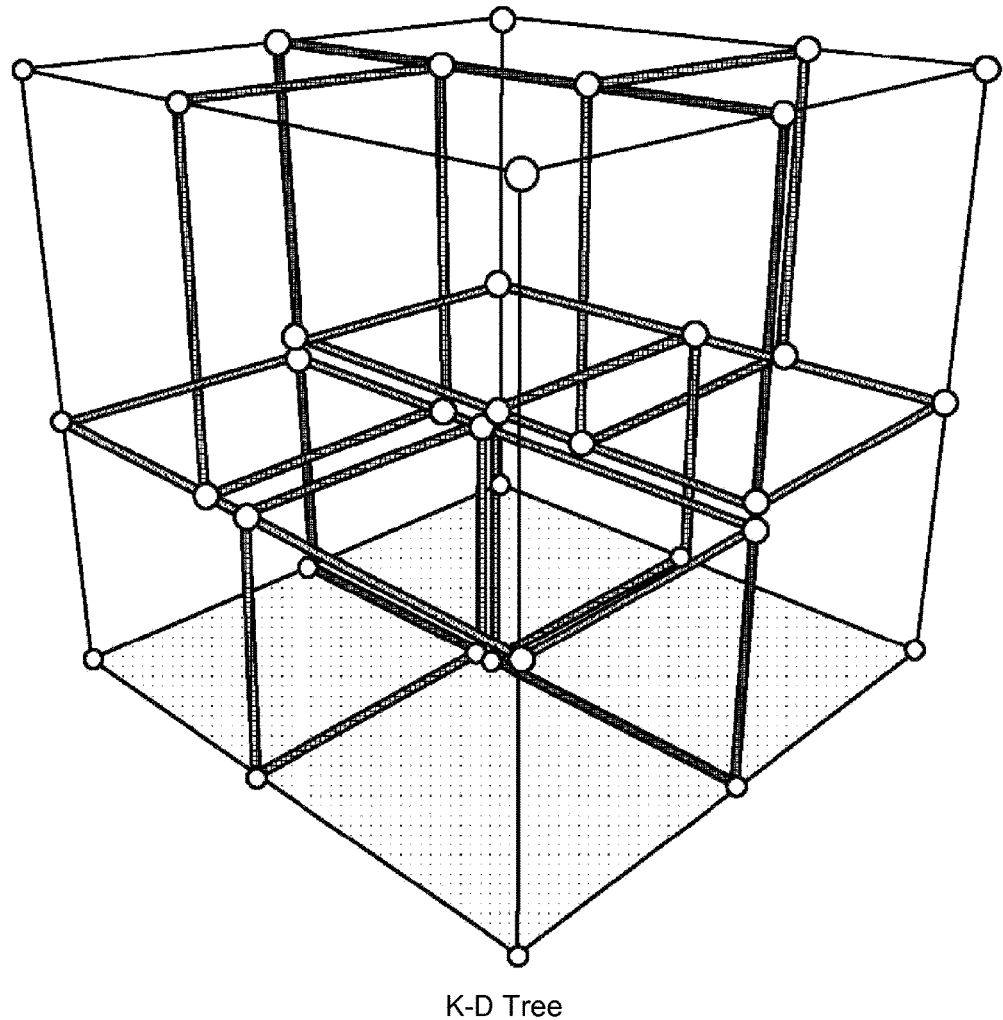
FIG. 1 is a diagram depicting a K-Dimensional tree (a three-dimensional tree for the sake of simplicity).
Figure 1A:
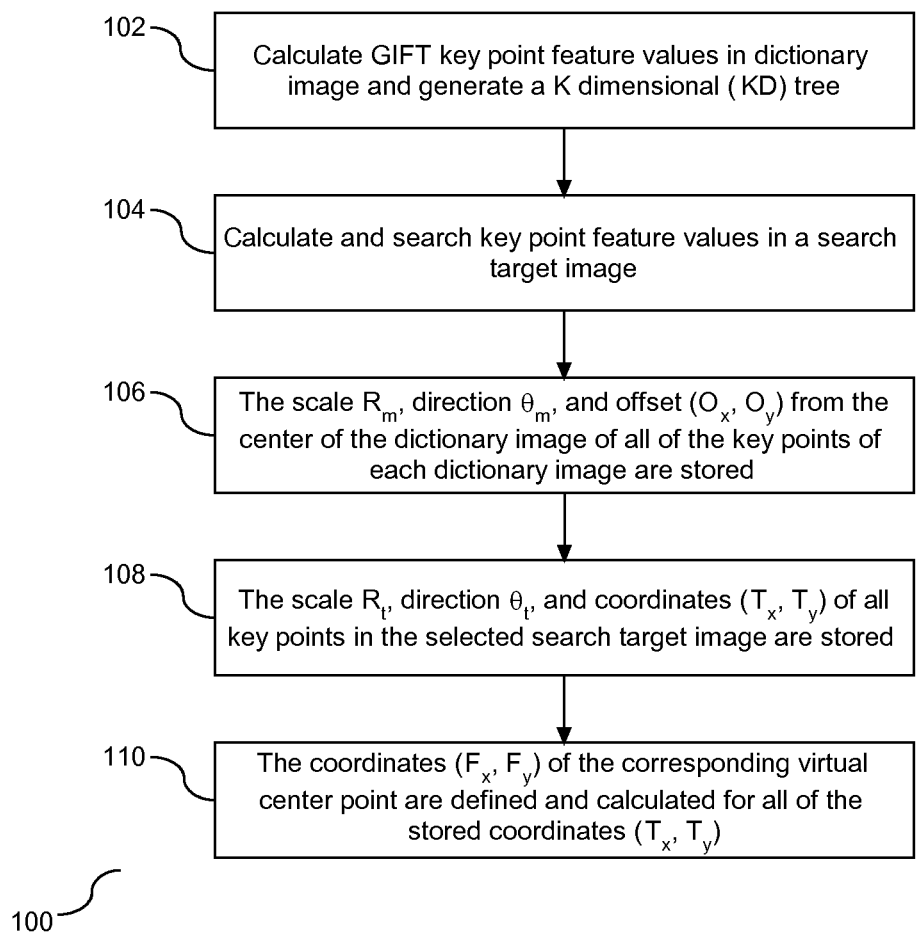
FIG. 1A is a flowchart depicting a process for calculating keypoint features of an image.

Referring to FIG. 1A, a flow chart (100) is depicted to illustrate process for calculating keypoint features of an image. A processing means called Gaussian Distributed Scale Invariant Feature Transform, herein after referred to as GIFT, is proposed to overcome the problems associated with the prior art and achieve practical required search times. In GIFT, a K-Dimensional (K-D) tree is generated by calculating GIFT keypoint feature values in a dictionary image (102). Calculating the GIFT keypoint feature values in a dictionary image includes detecting rotation and scale invariant feature points called GIFT keypoints in the dictionary image, calculating feature values of each keypoint, and storing the feature values. In one embodiment, these steps are repeated on a plurality of dictionary images. After the keypoint feature values of the dictionary images are stored, the keypoint feature values are used to generate and store a K-D tree. In one embodiment, the keypoint feature values are randomly assigned to n groups, and parallel processing is performed to generate n trees. Because dictionary images are classified beforehand, and K-D trees are generated for each class, high speed searches limited to certain classes may be performed.

Next, keypoint feature values in a search target image are calculated and searched (104). Calculating keypoint feature values in the search target image includes detecting GIFT keypoints in the search target image, and the keypoint feature values are then calculated and stored. In GIFT, as in SIFT (sequential comparison), feature values are represented as 128-dimensional vectors with real number elements. This allows for a performance comparison with SIFT. The K-D tree is then searched for the feature vectors of keypoints in a dictionary image closest in distance to the feature value vectors of all keypoints, and the distances are then recorded. Only those keypoints in the search target image whose distance does not exceed a given threshold value are selected, classified by dictionary image, and stored. The keypoints selected in this step and their corresponding keypoints in a dictionary image are referred to as keypoint pairs.

A K-D tree is a multidimensional tree structure that is prepared beforehand using keypoint feature values in a dictionary image set. An example of a K-D tree is illustrated in FIG. 1. For the sake of simplicity, the K-D tree shown in FIG. 1 is a 3-D tree. It is to be understood that the embodiments are not limited to a 3-D tree. A search is performed for keypoints in a dictionary image with feature values closest to the keypoints of the search target image by following the multidimensional tree. In one embodiment, the time required to perform the search is O(log N), where N represents the number of keypoints in the dictionary image set. While this can reduce search times, the time required to calculate keypoint feature values in dictionary images is the same. Furthermore, it also takes time to create a K-D tree index.

In a dictionary image, the keypoint coordinates ($T_x$, $T_y$) in the search target image are converted to virtual center coordinates ($F_x$, $F_y$) using the selected keypoint pairs and the conversion equations described below. This step is performed on all target keypoint coordinates. The number of additional virtual center points within a predetermined radius (r) of the virtual center point coordinates ($F_x$, $F_y$) is counted, and the count is stored. The previous step is executed on all of the virtual center points, and the virtual center point coordinates ($M_x$, $M_y$) with the highest count are stored as a candidate indicating the possibility of a match with the center of the corresponding dictionary image. When the number of counted virtual center points exceeds a predetermined threshold value ($N_c$), it is determined that a recognition target object present in the dictionary image is near the virtual center point coordinates ($M_x$, $M_y$) of the search target image. These steps are repeated on a number of dictionary images.

In one embodiment, the corner portions of gray scale patterns of pixels are used as keypoints. This method is known to detect keypoints faster than SIFT. As in the case of SIFT, the GIFT keypoint has scale and orientation.

Figure 2:
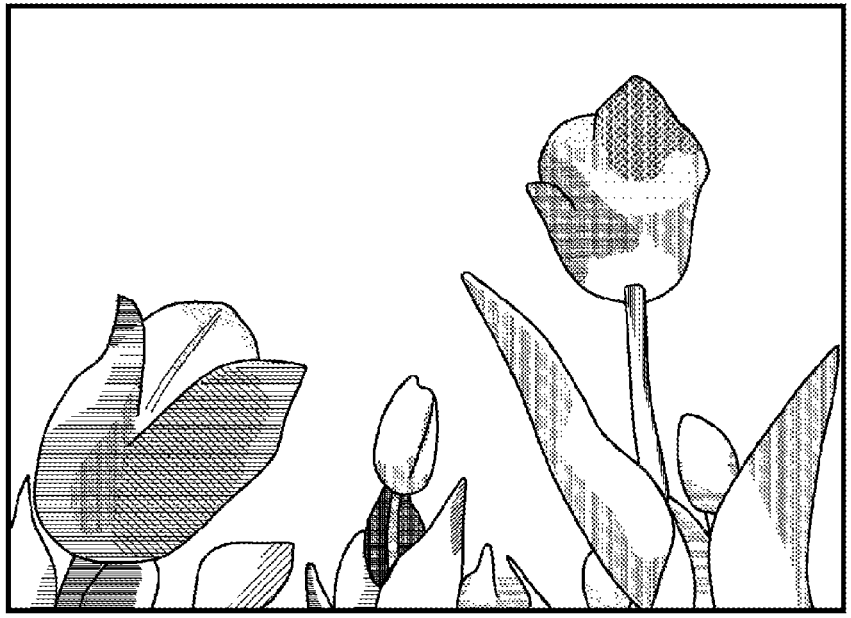
FIG. 2 is a diagram depicting an example of keypoint detection.
Figure 2:
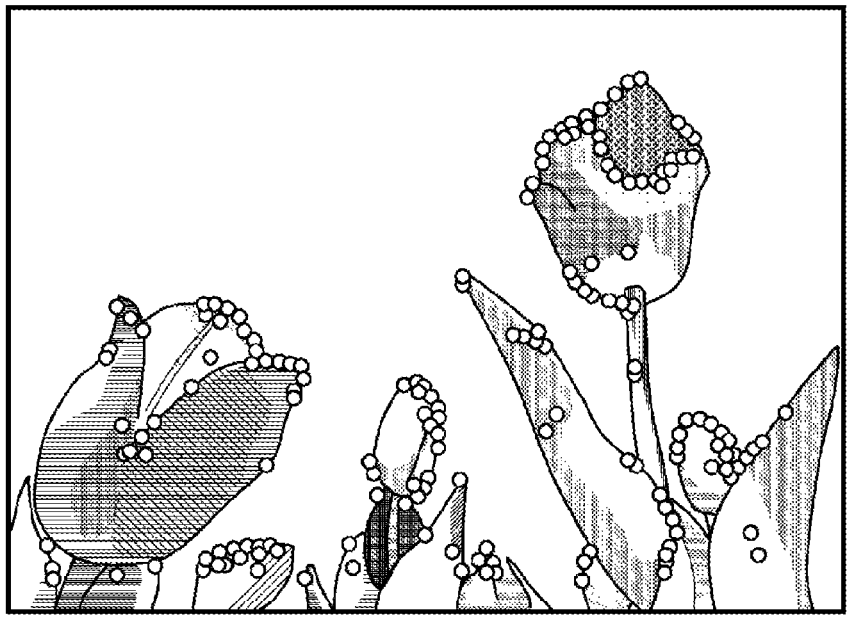

FIG. 2 is a diagram depicting an example of keypoint detection. FIG. 2(a) shows the original image, and FIG. 2(b) shows detected keypoints. The detected keypoints are denoted by circles. In one embodiment, GIFT feature values indicate the differences in brightness between 128 pairs of pixels randomly selected from a 31×31 pixel region surrounding a keypoint. As in the case of SIFT, GIFT feature values are represented as 128-dimensional vectors with real number elements.

Figure 3:
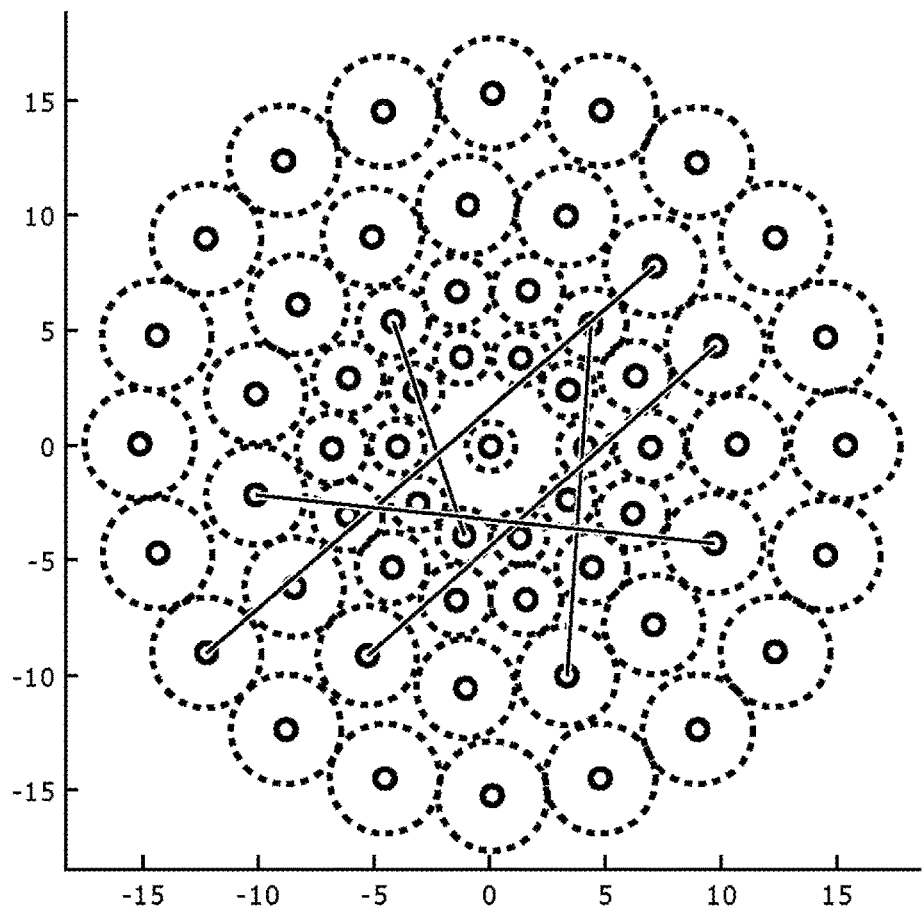
FIG. 3 is a schematic depicting 128 coordinate pairs selected randomly from among candidate coordinates in the Gaussian distribution, and the sequence of the brightness difference among the pairs rendered as a 128-dimensional feature vector.
Figure 4:
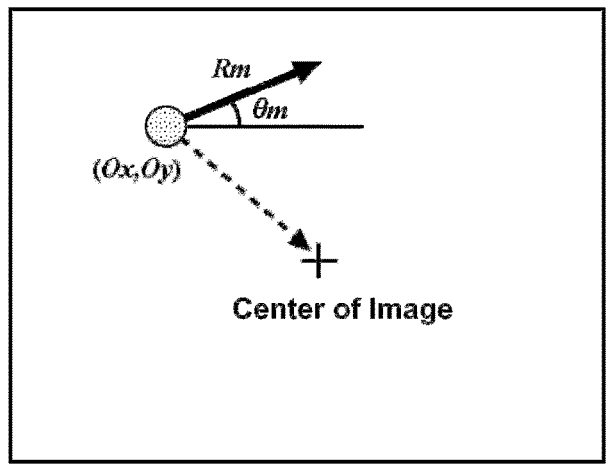
FIG. 4 is a diagram depicting a keypoint in a dictionary image.

FIG. 3 is a schematic depicting 128 coordinate pairs selected randomly from among candidate coordinates in the Gaussian distribution, and the sequence of the brightness difference among the pairs rendered as a 128-dimensional feature vector. In one embodiment, the density of the selected pixels form a Gaussian distribution are used as the coordinates of the keypoint as the origin point to readily reflect the gray scale pattern near the keypoint in the feature vector. Because the calculated differences in brightness include a mixture of positive real numbers and negative real numbers, the differences in brightness are compatible with, and have a technical affinity for, the efficient generation and searching of K-D trees. The scale $R_m$, direction $\theta_m$, and offset ($O_x$, $O_y$) from the center of the dictionary image of all of the keypoints of each dictionary image are stored (106). In one embodiment, the direction $\theta_m$ is measured in radians. FIG. 4 is a diagram depicting a keypoint in a dictionary image. The keypoint is denoted by a shaded circle (o). In one embodiment, the scale of a keypoint is proportional to the size of the object (FIG. 4).

Figure 5:
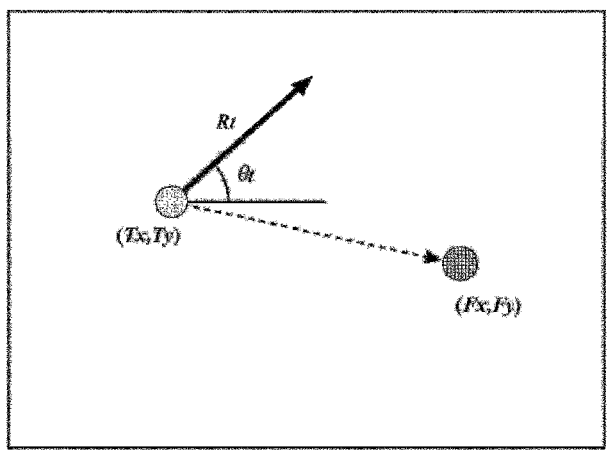
FIG. 5 is a diagram depicting a matching keypoint in the search target image and its virtual center point.

FIG. 5 is a diagram depicting a matching keypoint in the search target image and its virtual center point. In FIG. 5, the shaded circle (o) is a keypoint, and the cross-hatched circle (o) is the virtual center point. The scale of a keypoint is proportional to the size of the object. The scale $R_t$, direction $θ_t$, and coordinates (Tx, Ty) of all keypoints in the selected search target image are stored (108).

The coordinates ($F_x$, $F_y$) of the corresponding virtual center point are defined and calculated for all of the stored coordinates ($T_x$, $T_y$) (110) using the following equations:

$$F_x = T_x + (O_x \cdot R_t/R_m)(\cos(θ_t - θ_m)) + (O_y \cdot R_t/R_m)(\sin(θ_t - θ_m))$$

$$F_y = T_y + (O_x \cdot R_t/R_m)(-\sin(θ_t - θ_m)) + (O_y \cdot R_t/R_m)(\cos(θ_t - θ_m))$$

Figure 6:
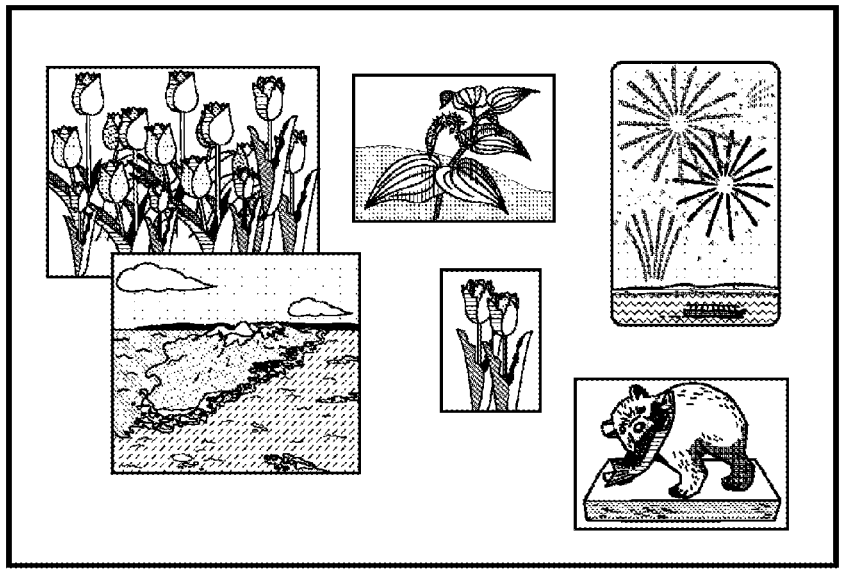
FIG. 6 is a diagram depicting search target images (1280× 720 pixels).

FIG. 6 is a diagram showing search target images (1280× 720 pixels). The dictionary images used to measure the processing speed included 9,900 images taken from internet sites and scenic images taken by camera (100 images) for a total of 10,000 images. Some of these dictionary images were combined and processed into search target images as shown in FIG. 6. All of the images used were taken by the present inventors, using an IBM® Power® 750 server with one 3.3 GHz core, and a Linux® operating system.

Figure 7:
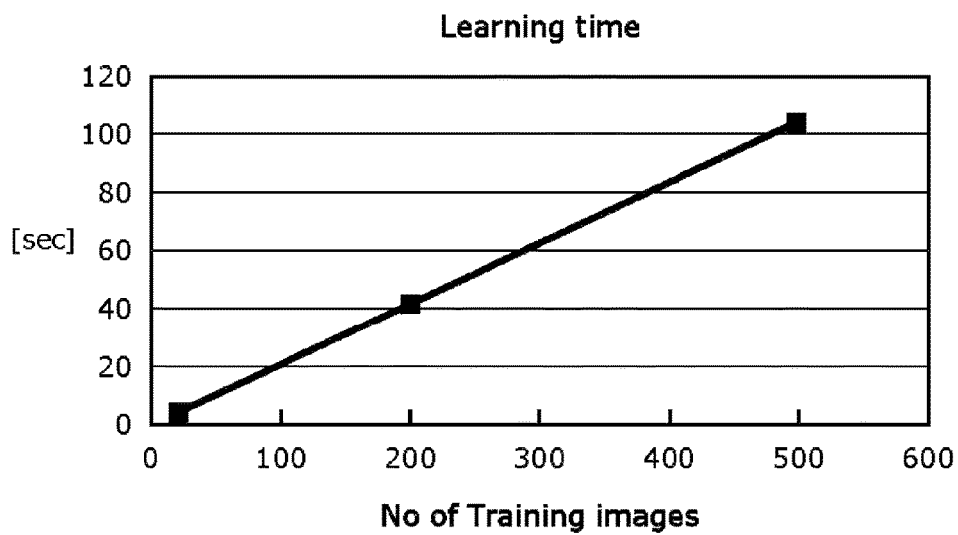
FIG. 7 is a diagram depicting the processing time required for training a SIFT algorithm.
Figure 8:
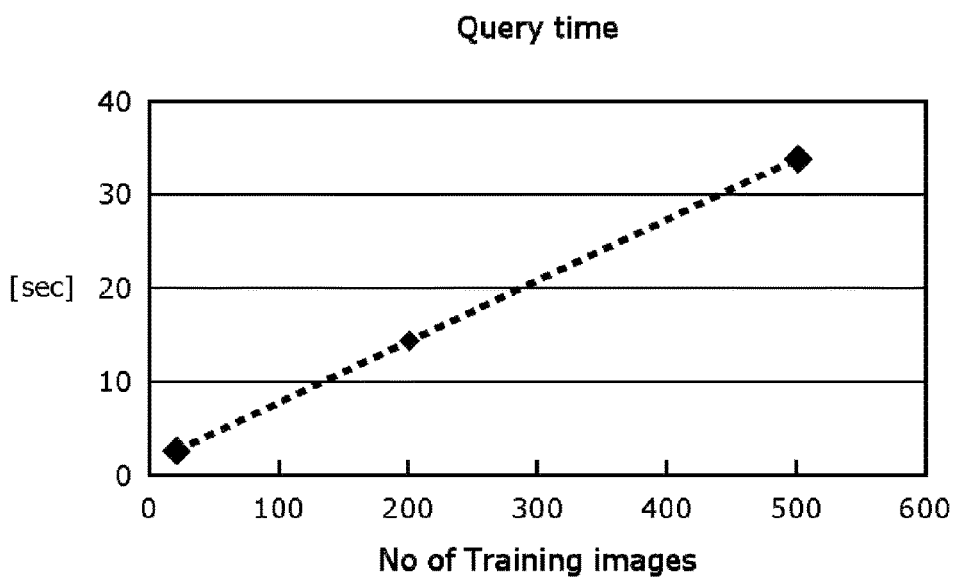
FIG. 8 is a diagram depicting the processing time required for sequential searching using a SIFT algorithm.

The time, training time, required to calculate features in dictionary images using SIFT sequential comparison and required search times were measured. FIG. 7 is a diagram depicting the processing time required for training a SIFT algorithm, and FIG. 8 is a diagram depicting the processing time required for sequential searching using a SIFT algorithm. In both cases, processing times increase in proportion to the number of dictionary images.

Figure 9:
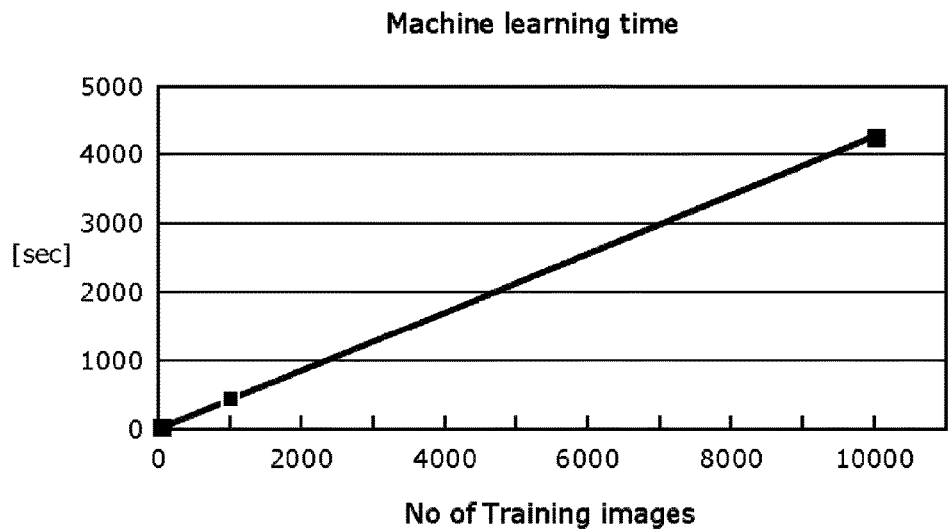
FIG. 9 is a diagram depicting the processing time required for dictionary image training using SIFT (including the creation of a K-D tree).
Figure 10:
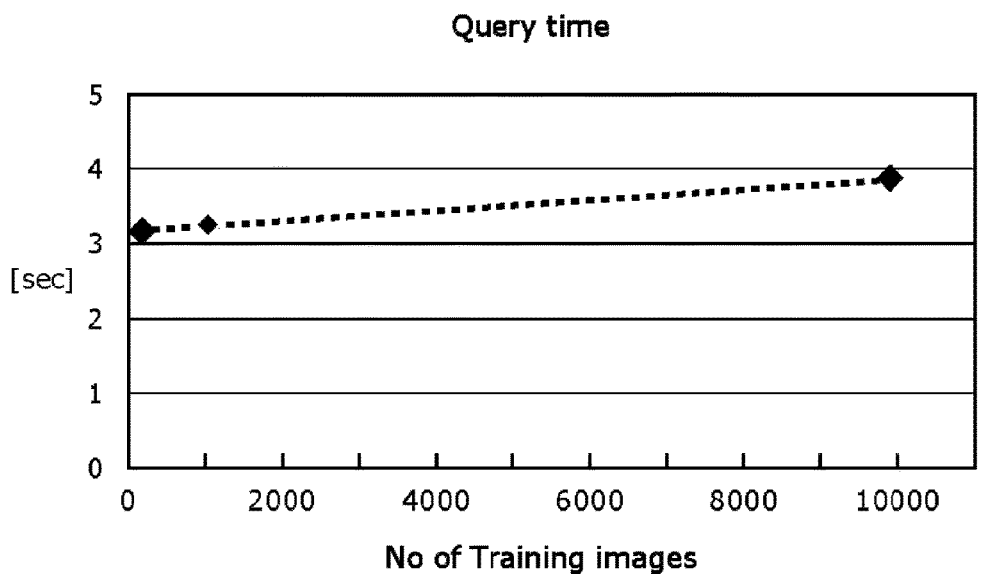
FIG. 10 is a diagram depicting the processing time required for high-speed searching of dictionary images using SIFT.

Next, the (training) time required to calculate keypoint features for dictionary images using SIFT keypoint features and for creating a K-D tree index, and search times were measured. FIG. 9 is a diagram depicting the processing time required for dictionary image training using SIFT, including the creation of a K-D tree, and FIG. 10 is a diagram depicting the processing time required for high-speed searching of dictionary images using SIFT. The required search time was relatively constant regardless of the number of dictionary images, and a significant increase in speed was observed compared to sequential processing. However, the training time was naturally proportional to the dictionary images.

Figure 11:
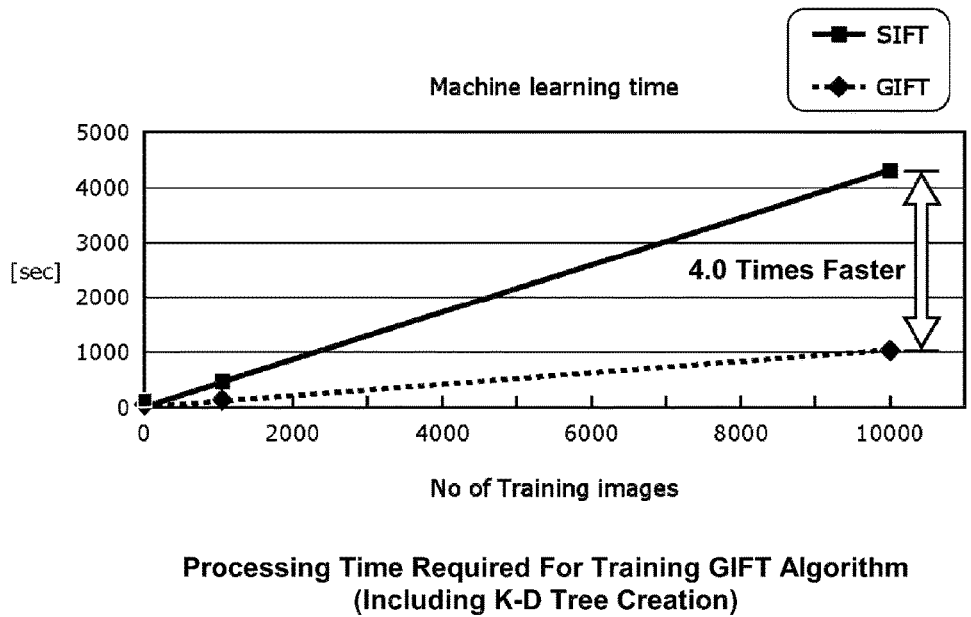
FIG. 11 is a diagram depicting the processing time required to train a GIFT algorithm (including K-D Tree creation).
Figure 12:
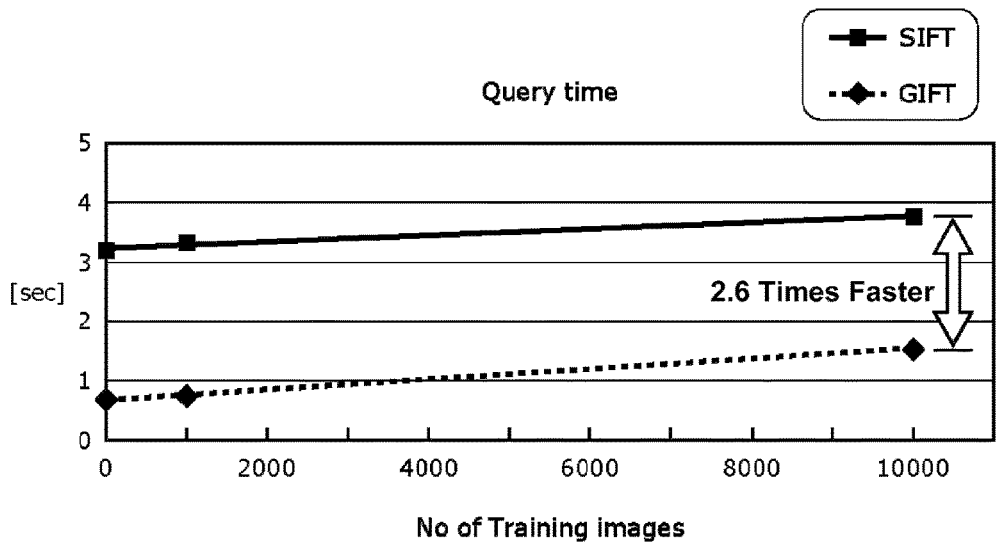
FIG. 12 is a diagram depicting the processing time required for high-speed searching by GIFT algorithm.

The processing times of an image search technique using GIFT feature values were measured. In the comparison to the technique using SIFT algorithms, 10,000 dictionary images were used. FIG. 11 is a diagram showing the processing time required to train a GIFT algorithm, including K-D Tree creation. In comparing the dotted line for GIFT to the solid line for SIFT, a speed increase of a factor of 4.0 is clear. A speed increase of a factor of 4.0 was confirmed during training (SIFT: 4256 [sec] vs. GIFT: 1072 [sec]) (FIG. 11). FIG. 12 is a diagram showing the processing time required for high-speed searching by GIFT algorithm. In comparing the dotted line for GIFT to the solid line for SIFT, a speed increase of a factor of 2.6 is clear. A speed increase of a factor of 2.6 was confirmed during image search (SIFT: 3.8 [sec] vs. GIFT: 1.5 [sec]) (FIG. 12).

The characteristics of the technical idea explained above can be realized as a technique (method, system, computer program) executed by a computer. All of the parameters can be stored in the memory of the computer serving as the hardware resource in the format such as the sequence of the computer program serving as the software resource. All of the operations, providing dictionary image data, calculating the coordinate conversion, counting the virtual center points, and storing the counted number, can be executed by a computer. Extraction of keypoints, representation of the feature values as vectors, and the storage of these can be performed very efficiently using a computer.

Figure 13:
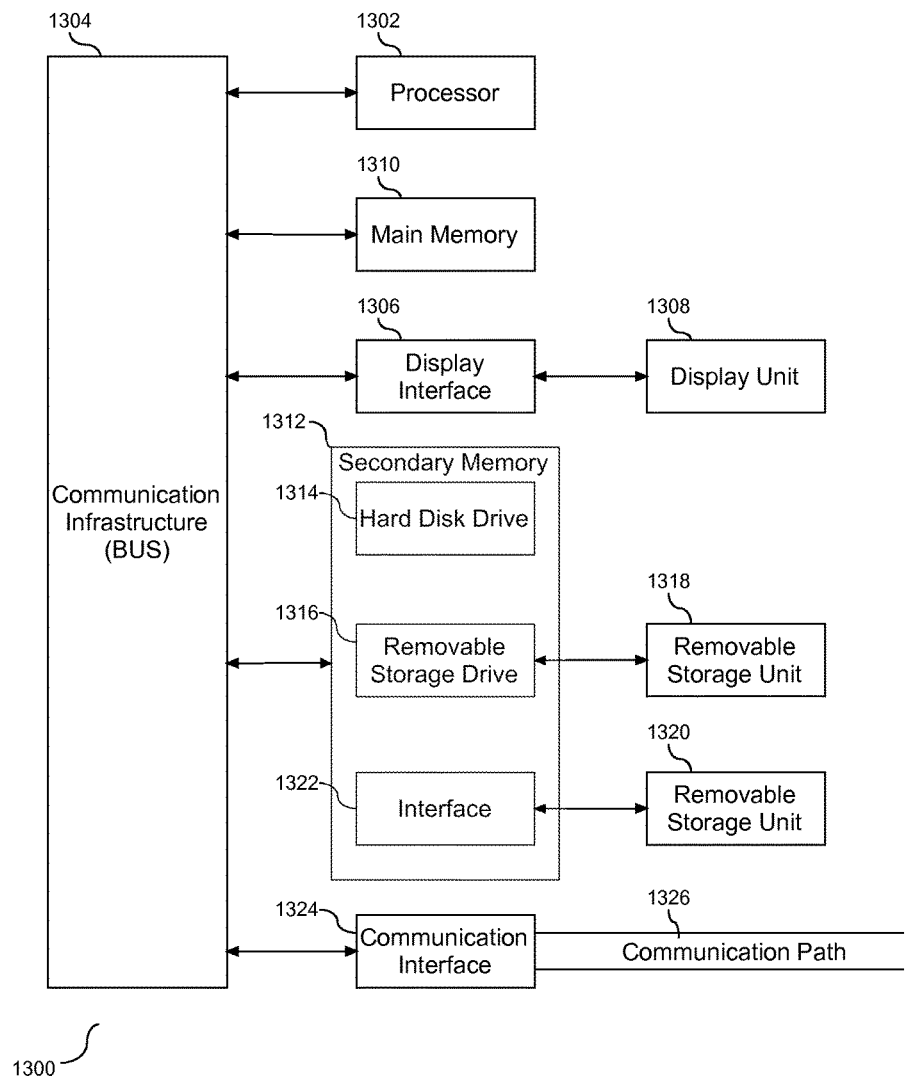
FIG. 13 depicts a block diagram of a computer system and associated components for implementing an embodiment.

Referring now to the block diagram of FIG. 13, additional details are now described with respect to implementing an embodiment. The computer system includes one or more processors, such as a processor (1302). The processor (1302) is connected to a communication infrastructure (1304) (e.g., a communications bus, cross-over bar, or network).

The computer system can include a display interface (1306) that forwards graphics, text, and other data from the communication infrastructure (1304) (or from a frame buffer not shown) for display on a display unit (1308). The computer system also includes a main memory (1310), preferably random access memory (RAM), and may also include a secondary memory (1312). The secondary memory (1312) may include, for example, a hard disk drive (1314) and/or a removable storage drive (1316), representing, for example, a floppy disk drive, a magnetic tape drive, or an optical disk drive. The removable storage drive (1316) reads from and/or writes to a removable storage unit (1318) in a manner well known to those having ordinary skill in the art. Removable storage unit (1318) represents, for example, a floppy disk, a compact disc, a magnetic tape, or an optical disk, etc., which is read by and written to by removable storage drive (1316).

In alternative embodiments, the secondary memory (1312) may include other similar means for allowing computer programs or other instructions to be loaded into the computer system. Such means may include, for example, a removable storage unit (1320) and an interface (1322). Examples of such means may include a program package and package interface (such as that found in video game devices), a removable memory chip (such as an EPROM, or PROM) and associated socket, and other removable storage units (1320) and interfaces (1322) which allow software and data to be transferred from the removable storage unit (1320) to the computer system.

The computer system may also include a communications interface (1324). Communications interface (1324) allows software and data to be transferred between the computer system and external devices. Examples of communications interface (1324) may include a modem, a network interface (such as an Ethernet card), a communications port, or a PCMCIA slot and card, etc. Software and data transferred via communications interface (1324) is in the form of signals which may be, for example, electronic, electromagnetic, optical, or other signals capable of being received by communications interface (1324). These signals are provided to communications interface (1324) via a communications path (i.e., channel) (1326). This communications path (1326) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1310) and secondary memory (1312), removable storage drive (1316), and a hard disk installed in hard disk drive (1314).

Computer programs (also called computer control logic) are stored in main memory (1310) and/or secondary memory (1312). Computer programs may also be received via a communication interface (1324). Such computer programs, when run, enable the computer system to perform the features of the present embodiment(s) as discussed herein. In particular, the computer programs, when run, enable the processor (1302) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer-implemented method for searching an image database comprising:
    detecting keypoints in a dictionary image composed of a plurality of pixels, wherein a density of the pixels distributed around a plurality of keypoints form a Gaussian distribution using coordinates of a keypoint as an origin point;
    selecting random pairs of pixels among the detected keypoints, the selection based on candidate coordinates for pixels distributed around the detected keypoints;
    comparing brightness between the selected pairs of pixels, including calculating a brightness difference between the selected pairs of pixels; and
    converting the calculated brightness difference into a feature vector, wherein the conversion includes calculating the feature vector; and
    using the feature vector to search for the dictionary image corresponding to an image of a target object.

2. The method of claim 1, wherein the calculated brightness difference is a combination of positive real numbers and negative real numbers.

3. The method of claim 1, wherein the feature vector is a 128-dimensional vector with real number elements.

4. The method of claim 1, wherein a keypoint is a rotation and scale invariant point.

5. The method of claim 1, wherein a keypoint is detected at least in part on shading patterns in the image.

6. The method of claim 1, further comprising:
    generating a multi-dimensional tree (K-D tree) using the calculated feature vector;
    searching the generated K-D tree for a given keypoint; and
    recording a distance between the feature vector and a closest keypoint to the feature vector.

7. The method of claim 6, further comprising limiting selection of keypoints whose distance is less than or equal to a given threshold value.

8. The method of claim 7, further comprising:
    providing data on the selected keypoints, including a size ($R_m$) and direction ($\theta_m$) of the feature vector, and an offset ($O_x$, $O_y$) from the coordinates at a center of the image to coordinates of a feature point;
    providing sizes ($R_t$) and directions ($\theta_t$) of feature vectors for coordinates ($T_x$, $T_y$) of a plurality of feature points in the target image;
    calculating coordinates of a virtual center point ($F_x$, $F_y$) in the target image derived from data comprising $T_x$, $T_y$, $O_x$, $O_y$, $R_m$, $R_t$, $\theta_m$, and $\theta_t$;
    counting a number of additional virtual center points within a predetermined radius of the virtual center point ($F_x$, $F_y$); and
    determining if the number of additional virtual center points exceeds a second threshold.

9. The method of claim 8, wherein
    $F_x$ is calculated as $F_x=T_x+(O_x \cdot R_t/R_m)(\cos(\theta_t-\theta_m))+(O_y \cdot R_t/R_m)(\sin(\theta_t-\theta_m))$, and wherein
    $F_y$ is calculated as $F_y=T_y+(O_x \cdot R_t/R_m)(-\sin(\theta_t-\theta_m))+(O_y \cdot R_t/R_m)(\cos(\theta_t-\theta_m))$.

10. The method of claim 8, further comprising:
    in response to the second threshold being exceeded, storing the virtual center point ($F_x$, $F_y$) and coordinates of a number of additional virtual center points as candidates;
    establishing the coordinates of a virtual center point corresponding to a maximum number of additional virtual center points as a center of a target image ($M_x$, $M_y$); and
    eliminating the additional virtual center points within the predetermined radius of the coordinates of the established virtual center point.

* * * * *